United States Patent [19]
Keller et al.

[11] 3,902,521
[45] Sept. 2, 1975

[54] SELF-CLOSING OR WATER-METERING VALVE ESPECIALLY FOR SANITARY FIXTURES

[75] Inventors: Manfred Keller; Eugen Weidner, both of Berlin, Germany

[73] Assignee: Firma Butzke-Werke Aktiengesellschaft, Berlin, Germany

[22] Filed: Nov. 8, 1973

[21] Appl. No.: 413,787

[52] U.S. Cl. ............... 137/375; 251/35; 251/44
[51] Int. Cl.² .............................. F16K 31/12
[58] Field of Search .......... 181/33 A, 33 S; 251/34, 251/35, 46, 43, 44, 45; 137/375

[56] References Cited
UNITED STATES PATENTS

| | | | |
|---|---|---|---|
| 865,479 | 9/1907 | Cooper | 251/44 |
| 945,038 | 1/1910 | Henkel | 251/44 X |
| 1,046,236 | 12/1912 | Wagner | 251/35 |
| 1,841,456 | 1/1932 | Shand | 251/44 |
| 2,406,259 | 8/1946 | Russell et al. | 137/375 |
| 3,347,519 | 10/1967 | Engstrom | 251/35 X |

*Primary Examiner*—Henry T. Klinksiek
*Attorney, Agent, or Firm*—Karl F. Ross; Herbert Dubno

[57] ABSTRACT

A housing of a self-closing valve has a passage lined with a noise-absorbing synthetic-resin body and is formed with a valve seat against which a valve body is engageable. A compartment above the valve body is connected to the pressurized inlet side of the passage through a small orifice and can be depressurized by a pilot valve so as to allow fluid pressure below the valve body to lift it from the valve seat and thereby allow flow through the passage. The compartment repressurizes through the orifice once the pilot valve is closed to lower the valve body again. The valve body is provided with a throttle element having substantially the same shape as the valve. The lining is bonded inside the housing or formed with longitudinal ribs which space it from the interior of the housing so as to form an air-filled insulating space and to form a drain passage for the pilot valve. A guide is formed unitarily with the valve seat and extends up around the valve body for its entire travel distance. This guide is formed with a plurality of slits extending right down to the valve seat, and spaced more closely together on the side of the guide toward the inlet.

17 Claims, 15 Drawing Figures

SELF-CLOSING OR WATER-METERING VALVE ESPECIALLY FOR SANITARY FIXTURES

FIELD OF THE INVENTION

The present invention relates to a self-closing valve of the so-called flushometer type. More particularly this invention concerns a water-metering valve used in toilets, urinals, and like sanitary fixtures.

BACKGROUND OF THE INVENTION

Self-closing flushometer-type valves usually have a valve body which is urged against its seat by fluid pressure in an actuating compartment which is connected to the pressurized inlet line via a small orifice, and which can be connected to the output line through a relatively large passage. Under normal conditions the pressure in this compartment is sufficient to hold the valve closed, because this pressure is equal to the pressure in the input line which is effective to open the valve. When, however, the pressure in the compartment is decreased by opening a pilot valve to drain the compartment into the outlet region of the passage, the valve body pulls away from its seat and opens the valve. The pilot valve is shut again so that pressure builds up in the compartment as a result of fluid bleeding through the small orifice, until the pressure in this compartment is sufficient to close the valve and hold it closed.

In one known type of valve a piston element is formed with a plurality of holes which are covered and uncovered as the element is reciprocated against fluid and spring pressure on one side and fluid pressure along on the other. In this manner a sudden closing and, hence, pipe hammer is avoided, but when used with high pressure it tends to produce a considerable amount of noise caused principally by cavitation as the device closes. The spring pressure must be adjusted in dependence on the prevailing water pressure, so that any change in this pressure whether temporary or permanent causes malfunctioning of the valve, mainly evidenced by very noisy operation. Similarly the spring often changes characteristics so that adjustment is necessary, and deposition of mineral deposits also affects the performance of the device.

It is also known to use several concentric throttle bodies which are operated by a spring and by fluid pressure and which are at least partially covered in the open position of the valve. The outer throttle body is formed at its output end as a tapered tube and the inner throttle body is guided on a shaft in the valve housing. A spring actuates these elements to hold the valve closed, and this spring must be switched each time the water pressure changes past the range of the spring being used. With heavy use the spring is quickly worn out and requires replacement, which is quite expensive as costly metals must be used as a result of the wet environment.

In another known type a diaphragm shaped as a washer is used which has a central hole through the water flows. A conical seat is disposed below this hole so that as the pressure increases the diaphragm deforms into the seat and limits flow, while with low pressure full flow is possible. Such an arrangement often has an unusably short service life as the constant deformation of the membrane ruins it.

Such valves are frequently extremely noisy due to the quick rush of water they create and the often high pressures they are used to control. Another difficulty with such devices is that they produce an irregular and non-uniform flush, that is, there is an initial heavy rush of water followed by a decreasing flow that is not completely effective to flush out the receptacle. Due to the operation of such valves it has been considered impossible to obtain a uniform quite flow.

OBJECTS OF THE INVENTION

It is therefore an object of the present invention to provide an improved self-closing valve of the above-described general type.

Another object is the provision of such a valve which operates quietly.

A further object is to provide a self-closing or water-metering valve for sanitary fixtures which closes smoothly and which has a long service life.

Yet another object is a valve which produces a uniform flush.

SUMMARY OF THE INVENTION

These objects are attained according to the present invention in a self-closing or water-metering valve for sanitary fixtures wherein the inside of the housing is lined at least partially with sound-absorbing material. The valve body, which is reciprocal toward and away from a seat, travels in guides mounted on the valve seat. A throttle is provided which has a plurality of washer-like elastomeric rings which are deflectible to limit flow when the pressure is high and to open up and permit full flow when pressure is low, thereby creating uniform flow.

In accordance with other features of this invention the lining is spaced from the inside of the housing and is formed with the bleed passage into which the actuating compartment is emptied by the flush button to operate the valve. This lining thus forms an air-filled insulating chamber with the housing so as to damp noise completely. Soft rubber, sponge rubber, or the like is used for the lower part of the lining, which may also form the valve seat, and hard rubber or a synthetic resin is used for the upper remaining portions. The lining can be hung free in the upper part of the valve and supported laterally on bumps or welts in the lower part of the valve.

According to another feature of this invention the valve body is provided with a throttle body having a shape matching that of the valve seat so that flow through the valve is cut off quietly, not accompanied by the sudden closing common in flushometers. Such a throttle body can be frustoconical, spherical, formed with slits or notches, or otherwise constructed as a body of revolution so as to cut off fluid flow evenly as the valve member closes on the seat.

According to the invention the guide for the valve body is unitary with the valve seat and extends axially up around the valve body. This guide is a plurality of parallel fingers or a tube formed with a plurality of slits, so that fluid flow under the valve body and past the seat is readily possible so long as the body does not rest on the seat.

DESCRIPTION OF THE DRAWING

The above and other objects, features, and advantages of the present invention will become more readily apparent from the following description, reference being made to the accompanying drawing in which.

SPECIFIC DESCRIPTION

Figure 1:
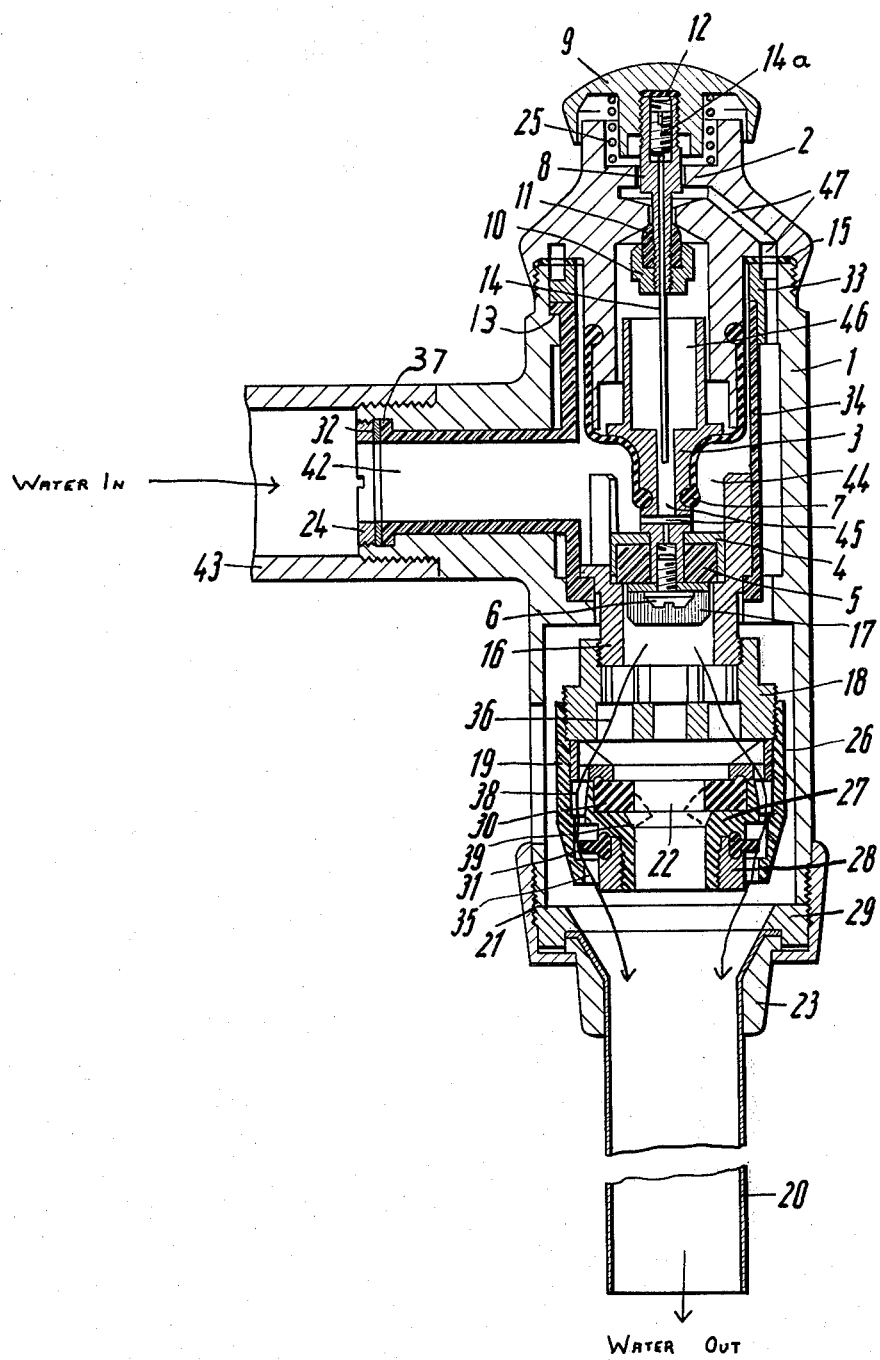
FIG. 1 is a longitudinal section through a valve according to the present invention.

The valve shown in FIG. 1 is used as a flush valve for a toilet or urinal. It comprises a basically cylindrical housing 1 with a laterally projecting inlet nipple 42 having an external thread to which a water feed pipe 43 is connected. At its other side the housing 1 is provided with an outlet pipe 20 which is connected by means of a ring 29 and an insert 23 which surrounds the flared end of the pipe 20 and allows a nut 21 to secure these elements 23 and 29 tightly to the housing 1.

This valve is normally closed with no flow in the pipe 43 or out the pipe 20. Thus the interior 44 of the housing 1 is under a pressure equal to the pressure in the line 43, and the counterpressure chamber 46 is also under this pressure to hold a valve element 5 against a seat 16.

More specifically a valve body 3 is linearly reciprocal inside the housing 1 and is fitted at its lower end with a cup washer 4 in which the body 5 is secured by a screw 6 fitted with a throttle element 17. A pair of mutually orthogonal bores 45, one of which lies on the axis of the body 3, form a restricted passage between the chambers 44 and 46.

The top end of the housing 1 is covered by a cap 2 which is threaded to the housing 1 with a perforated washer-seal 15 between the two. The cap 2 is formed with a valve seat against which is engaged a valve body 11 carried by a nut 19 screwed onto a body 8 in turn screwed into a button 9. A spring 25 holds the button 9 in a position with the valve body 11 blocking entrance of water into a passage 47 leading to the downstream side of the valve assembly. A screw 14a with a pin extension 14 projecting into the hole 45 is screwed into this body 8, with a washer 12 serving to prevent leakage at this point. A cuff 7 is connected between the element 3 and the cap 2 to prevent fluid flow from the chamber 44 to the chamber 46 except through the passage 45.

The inside of the housing is provided with a soft synthetic-resin lining 34 secured by a perforated ring 33 under the cap 2 on a shoulder 13, in the extension 42 under a washer 32 by a threaded ring 24 against another shoulder 37, and under the body 16 forming the valve seat for the body 5. This lining 34 is bonded in place in all other regions of contact with the housing 1.

Normally the button 9 is up and the pressure in chambers 44 and 46 is identical, thereby holding the element 5 down against its seat 16. When the button 9 is depressed, however, the chamber 46 is vented through the passage 47 so that the pressure in the chamber 46 drops below that in the chamber 44, and the body 3 is forced up to pull the element 5 away from its seat. Release of the button 9 allows the chamber 46 to pressurize again through the passage 45 and, as the pressure above the body 3 builds up to equal that below it, the body 3 will drop and stop the flow of water out the pipe 20. The rate at which the chamber 46 pressurizes, and therefore the flushing time, is determined by the extent to which the rod 14 projects into the passage 45 as determined by screw 14a. The more the rod 14 extends into the passage 45 the longer the flush will be. Of course it is also possible to flush by simply sending a pressure surge in through the pipe 42, as is done in institutions frequently to insure regular flushing of the urinals and toilets. Such a pressure surge lifts the body 3 since the passage 45 is not large enough to allow the pressure on both sides of the body to equalize rapidly.

Downstream of the valve seat 16 there is provided a noise muffler which has an upper ring 18 formed with apertures 36 and screwed onto the element 16 so as to subdivide the stream of water issuing from this element 16 into a plurality of parallel streams. An outer tube part 19 is screwed onto this ring 18 and is formed with an inner annulus 27, with an annular passage 38 subdivided into a plurality of small holes separating the two. An apertured ring 26 is clamped between the elements 18 and 27 and serves to secure an elastomeric ring 30 formed with a central hole 22 in place, a bead on this ring 30 being received in the element 26. Another ring 31 is clamped below this ring 30 on the outside of the element 27 by another ring 28, with beads on this ring 31 being received in both the ring 28 and the element 27. An annular passage 35 is thus formed between the parts 27 and 19. Below the ring 30 the part 27 is formed with a frustoconical surface 39 whose wider diameter is larger than the diameter of the hole 22 and whose narrower diameter is smaller than this hole 22.

This arrangement works as follows: During the initial high-pressure rush of water as the valve opens the ring 31 is deflected down to cover the passages 35 and block fluid flow along this path, while the ring 30 deforms to partially block the central passage formed in part by its hole 22. As the flow lessens the two rings move back into their solid-line positions and allow flow both through the central passage and around the outside of the part 27 as shown by the arrows. Thus, when the flow is at high pressure and velocity it is limited to a single central stream, but when its pressure and therefore its velocity drop the central stream is made larger and a peripheral stream is formed. The overall effect of this is to muffle noise and create an even flush since the overall flow rate through the pipe 20 remains relatively uniform since at high pressure and velocity the stream size is limited and at low pressure and velocity the stream size is expanded.

Figure 2:
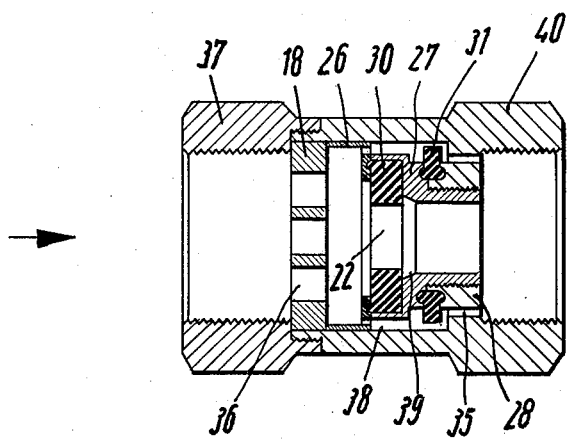
FIGS. 2–4 are longitudinal sections through sound dampers usable with the valve of this invention.
Figure 3:
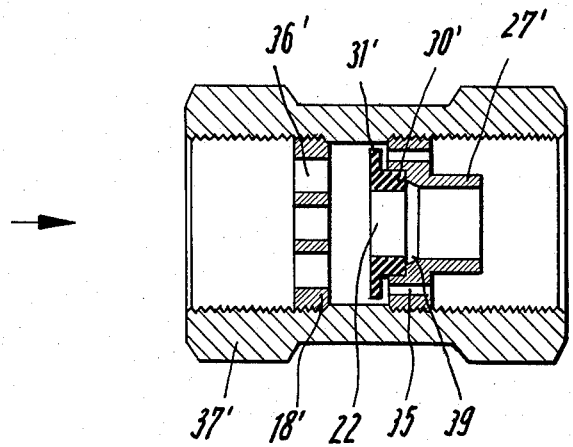
Figure 4:
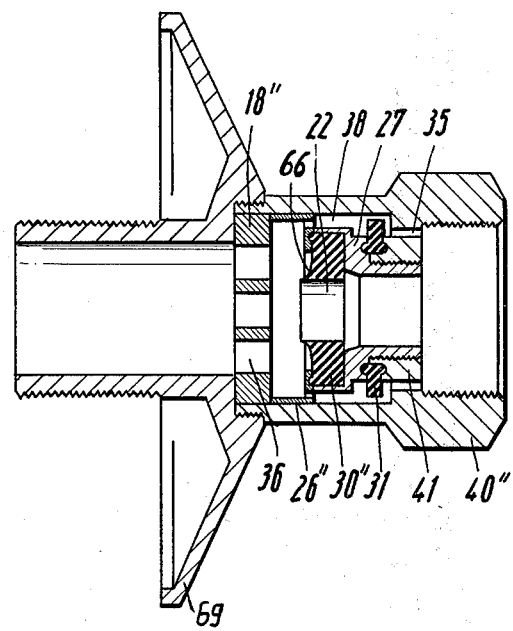

FIG. 2 shows how the flow regulator can be received between two pipe connectors 37 and 40. It is also possible to provide a rubber washer 18' which has a laterally projecting flange 31' as shown in FIG. 3 which fits within a sleeve 37' in which only the element 27' and 36' are screwed. The flange 31' is equivalent to the ring 31 of FIG. 1. The arrangement of FIG. 4 is used upstream of a flushometer valve and is secured to a wall-mount bracket 69 which secures the perforated element 18'' against the holder 26'' which in turn secures the ring 30'' in place. This ring 30'' is formed with a lip 66 directed upstream against the flow to insure greater flow limiting under high pressure. The ring 31 is secured by a nut 41 identical to the nut 28 of FIG. 1. The element 40″ has the same function as the part 19 of FIG. 1.

It is possible with the devices shown in FIGS. 1–4 to obtain a constant flow rate with pressures varying between 1.0 bar (kilogram-force/cm²) to 6.0 bar. The various washers can be replaced by softer or stiffer ones to obtain different characteristics, and it is possible to provide a plurality of such flow controllers in series in order to insure control over the widest range.

Figure 5:
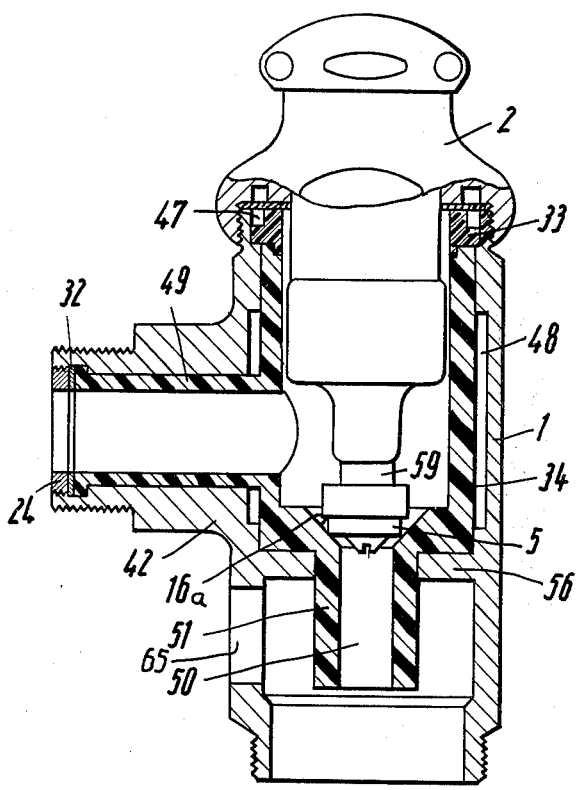
FIGS. 5 and 6 are longitudinal and cross sections, respectively, through another embodiment of the valve of the present invention.
Figure 6:
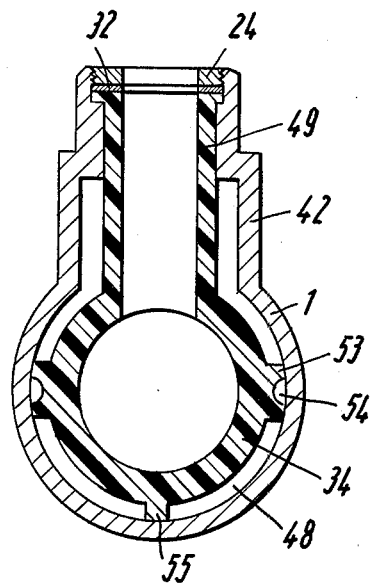

The arrangement shown in FIGS. 5 and 6 has a lining 34 which is formed with a lateral extension 49 so that it can fit within the housing 1 of a valve similar to the valve of FIG. 1. Here however the lining 34 also forms a frustoconical seat for the valve body 5 as well as an outlet nozzle 51 having a passage 50 extending past the lateral opening 65 in the downstream side of the housing 1. Longitudinally extending stiffening ribs 53 and 55 space the body of the lining 34 inwardly from the inside of the housing 1, and the ribs 53 form longitudinally extending drain canals 54. These ribs 53 and 55 are bonded in place by vulcanising.

Figure 7:
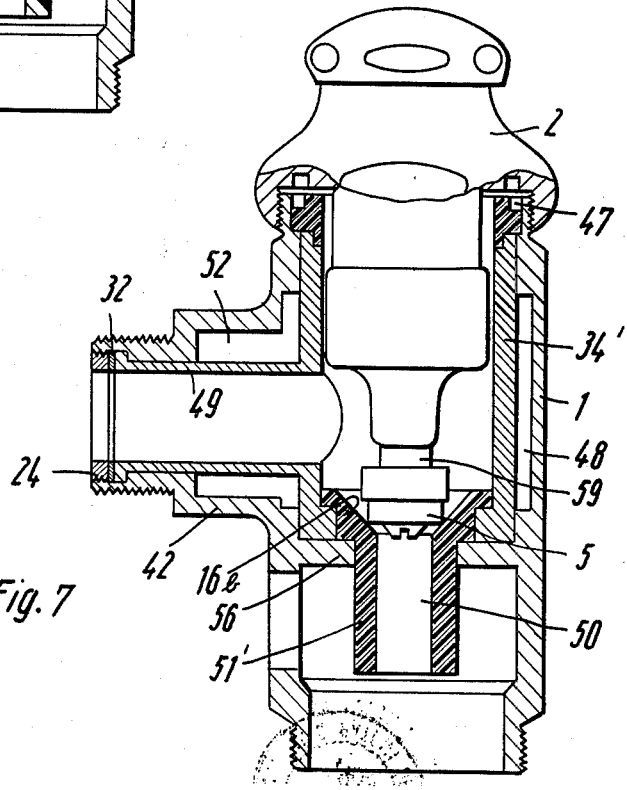
FIG. 7 is a longitudinal section througn yet another embodiment.

The embodiment of FIG. 7 is identical to that of FIGS. 5 and 6 except that the seat 16b and the outlet 51′ are a separate piece set into the lining 34′. In both embodiments the housing 1 is formed with an internal ledge 56 serving to support the valve seat.

Figure 8:
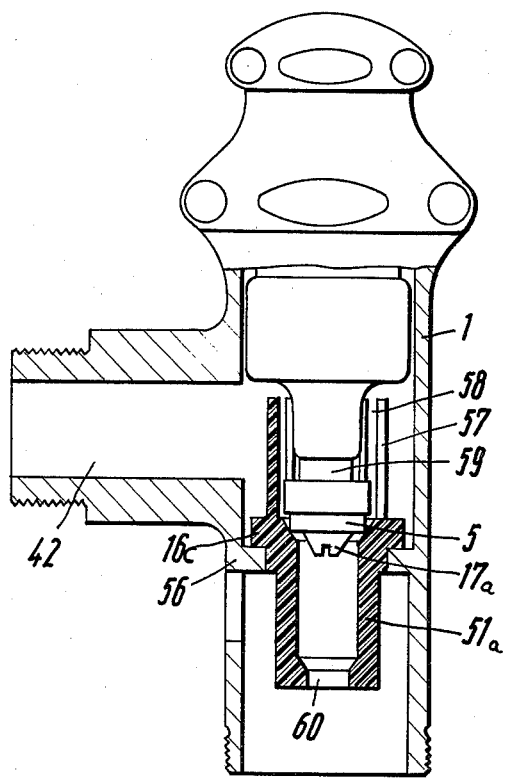
FIGS. 8 and 9 are sections similar to FIGS. 5 and 6 respectively through a further embodiment of this invention.
Figure 10:
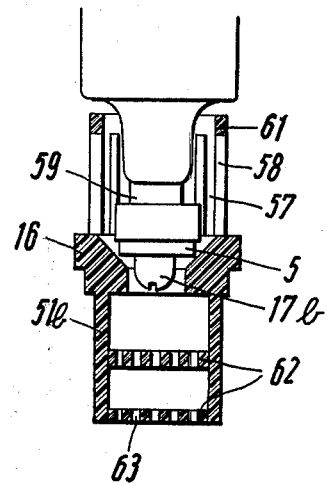
FIG. 10 is a detail view of a variant of a valve seat usable in the embodiment of FIGS. 8 and 9.
Figure 9:
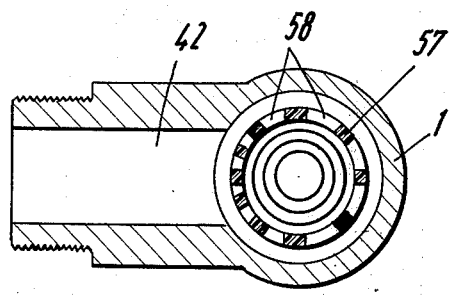

FIGS. 8 and 9 show an arrangement wherein the valve body 5 is mounted on a piston 59 that is loosely guided in a plurality of elements 57 defining slits 58 which are closer together in that region of the guide directed toward the inlet passage 42 than on the opposite side. In addition an outlet tube 51a is formed integrally with the guides 57 and is itself formed with a seat 16c and an outlet restriction 60. This arrangement insures uniform fluid flow through the valve and quiet operation. The embodiment of FIG. 10 is similar except that instead of a frustoconical flow regulator 17a a ball-shaped regulator 17b is used, a valve body 61 is provided with slits 58, and a pair of apertured walls 62 formed with holes 63 provided in the tube 51b to regulate flow.

Figure 11:
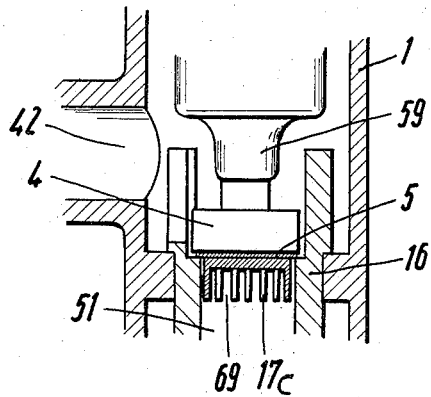
FIGS. 11–15 are longitudinal sections through various valve members according to the present invention.
Figure 12:
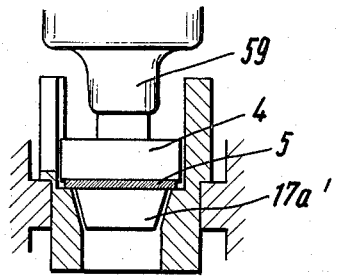
Figure 13:
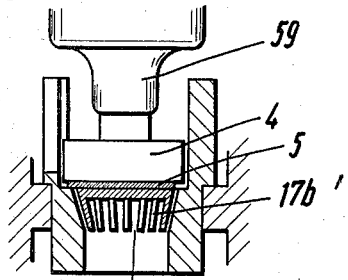
Figure 14:
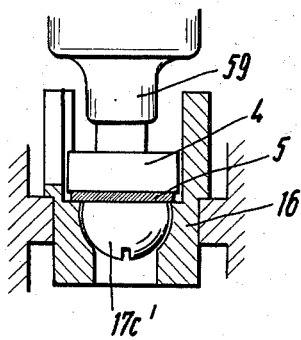
Figure 15:
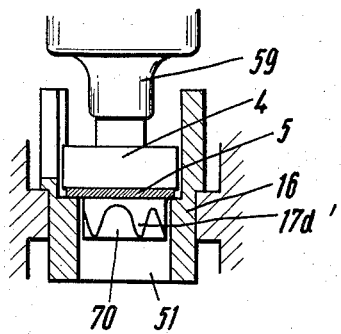

The arrangement of FIG. 11 is similar to those described above except that a flow regulator 17c is used which has a plurality of fingers forming slots 69. The arrangement of FIG. 12 has a regulator 17a′ which is frustoconical and has the same taper as the corresponding region of the outlet tube. In FIG. 13 the embodiments of FIGS. 11 and 12 are combined in a regulator 17b′ so as to form slits 69′ lying on a frustocone. In FIG. 14 the regulator 17c′ is a ball, and in FIG. 15 the regulator 17c′ is formed with sinusoidal notches 70.

The valves according to the present invention operate extremely quietly and give a very uniform and effective flush. They have a long service life and present few service problems.

We claim:

1. A self-closing valve comprising:
   a housing formed with throughgoing passage formed with a valve seat;
   a sound-absorbing insulating element at least partially lining said passage;
   a linearly displaceable valve member in said housing engageable with said seat for blocking fluid flow through said passage;
   fluid-pressure operated means for linearly displacing said valve member toward and away from said seat;
   a guide on said seat closely surrounding said member along its full path of linear displacement;
   sound-deadening means in said passage downstream of said valve seat for reducing noise during seating of said member on said seat; and
   means in said passage for limiting fluid flow therethrough.

2. The valve defined in claim 1 wherein said means for limiting fluid flow includes a throttle body formed with at least two throughgoing openings and a pair of flexible throttle elements each adjacent a respective one of said openings, at least one of said throttle elements being a ring engageable over the mouth of its respective opening.

3. The valve defined in claim 2 wherein the other throttle element is also a flexible ring secured around the inside of the other opening and deformable to limit fluid flow therethrough.

4. The valve defined in claim 3 wherein said one opening is formed of a plurality of orifices formed in said throttle body in an annular array around said other opening.

5. The valve defined in claim 4 wherein both of said rings are circularly annular and said other ring has an outside diameter greater than the inside diameter of said one ring, said throttle body comprising a plurality of elements releasably secured together around said rings.

6. The valve defined in claim 5 wherein said throttle body is formed with a screw thread engageable with said housing downstream of said valve seat, said openings being directed toward said seat and each of said rings being on the upstream side of its respective opening.

7. The valve defined in claim 4 wherein both of said rings are unitarily formed, said one ring being a flange formed on said other ring.

8. The valve defined in claim 3 wherein said one ring is formed around its inner periphery with a lip directed back in the direction of fluid flow through said passage toward said valve member.

9. The valve defined in claim 1 wherein said sound-absorbing element is elastic.

10. The valve defined in claim 9 wherein said elastic element is bonded to the interior of said housing.

11. The valve defined in claim 10 wherein said housing is formed with an inlet nipple, said elastic element extending over the entire inside of said passage and the interior of said nipple.

12. The valve defined in claim 11 wherein said elastic element is formed with said valve seat.

13. The valve defined in claim 9 wherein said sound-absorbing element is spaced from the interior of said housing.

14. A self-closing valve comprising:
   a housing formed with a passage having an inlet end and an outlet end;
   a resilient body in said housing forming a valve seat and formed with a guide extending from said seat toward said inlet end and formed with a plurality of substantially parallel elongated slits terminating at said seat;
   a valve element in said housing displaceable along said guide toward and away from said seat and sealingly engageable with said seat;
   means independent of said slits for controlling the fluid pressure differential on said element;

an outlet tube formed on said body and extending from said seat toward said outlet end; and means for reciprocating said valve element along said guide.

15. The valve defined in claim 14 wherein said inlet end is a nipple extending laterally from said guide, said slits being spaced more closely together on the side of said guide toward said nipple than on the side of said guide turned away from said nipple.

16. The valve defined in claim 14 wherein said valve seat has a surface formed as a surface of revolution whose central axis is parallel to the direction of displacement of said valve element, aid element being provided on its end turned toward said seat with a throttle body having an outer surface of the same shape as said seat.

17. The valve defined in claim 16 wherein said throttle body is hollow and is open toward said seat and formed on its sides with a plurality of slits open toward said seat.

* * * * *